United States Patent Office 3,022,120
Patented Feb. 20, 1962

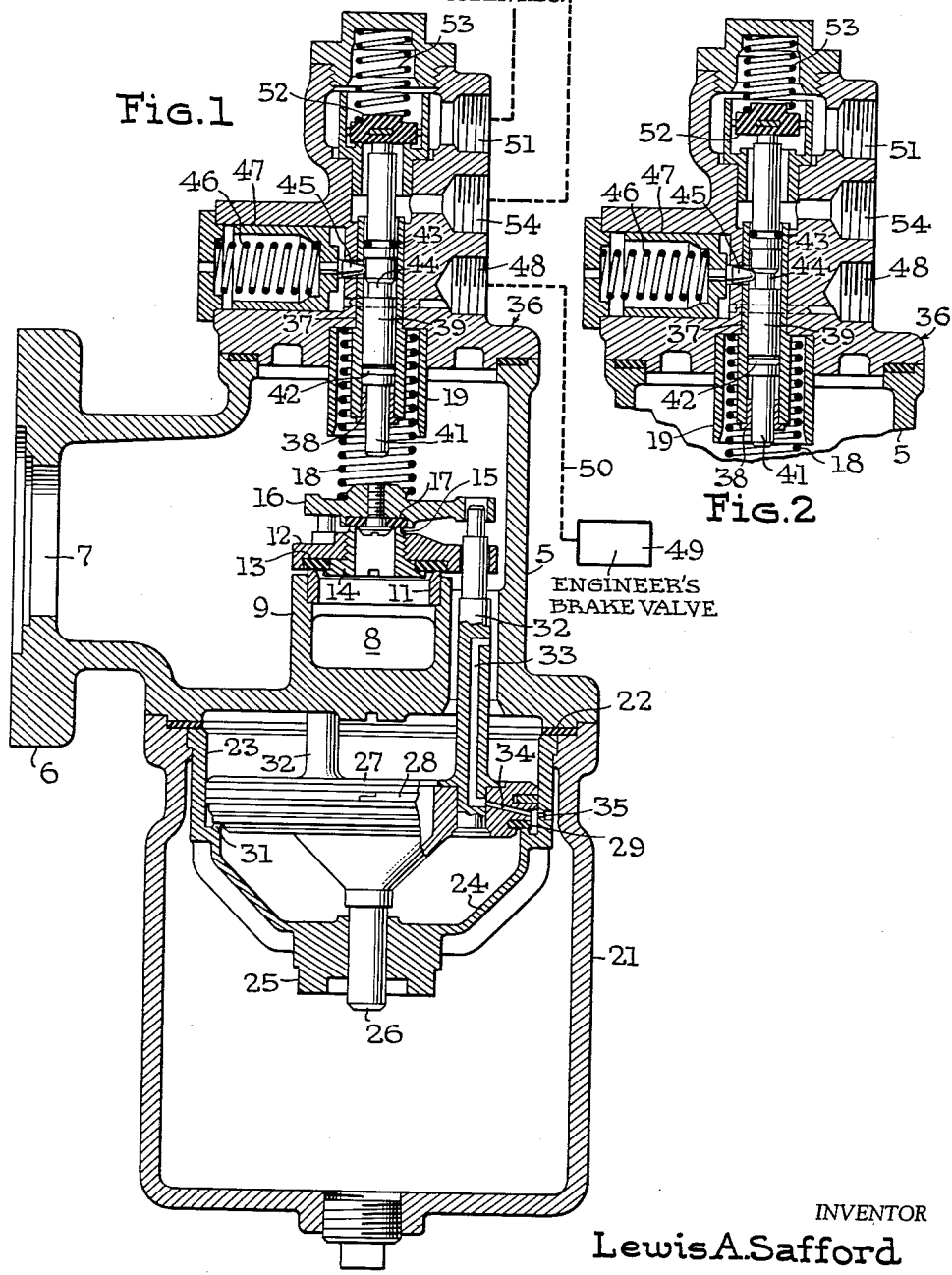

3,022,120
EMERGENCY BRAKE VALVE WITH POWER CUT-OFF
Lewis A. Safford, Watertown, N.Y., assignor to The New York Air Brake Company, a corporation of New Jersey
Filed Oct. 28, 1959, Ser. No. 849,380
3 Claims. (Cl. 303—82)

This invention relates to air brakes and particularly to emergency application functions.

Most air-brake control valves include an emergency valve, and in several of these the emergency valve serves to charge an accessory pipe when the emergency valve responds in emergency. This charging response can be applied usefully in many ways, for example, to operate rail sanders, or operate power shut off for the propelling engines, or both, or to perform other functions useful when an emergency stop is in progress. These are incidental functions stemming from, but not strictly a part of the invention.

Applicant's assignee has long manufactured under the Campbell Patent 1,938,738, issued December 12, 1933, a brake pipe vent valve known as the KM vent valve, which is simple and remarkably reliable. It responds to brake-pipe pressure reductions exceeding a critical intensity, whether these are initiated by conditions local to the brake pipe, such as a break-in-two, or whether they are initiated by manipulation of the engineer's brake valve or by opening of a dead-man valve. As so used, no means to charge an accessory pipe has been afforded, so that the availability of the valve has been limited.

The present invention involves the substitution of a new cap on the KM vent valve. This cap includes a secondary valve, as simple and reliable as this long-proven KM valve itself, and offers an economical way to add functions which have been had heretofore only at the price of considerable complication.

The effect is to provide a front-end control installation which is simple and reliable and remarkably versatile in that it can be similarly applied to any of several known braking systems without significant remodeling of the system itself, and with the attainment of much desired added functions.

One embodiment which has demonstrated utility in tests is illustrated in the accompanying drawing, in which:

FIG. 1 is a vertical axial section of the KM vent valve with the improved cap and with connections indicated by legends. The valve is in running position.

FIG. 2 is a view showing the cap in emergency position; connections to the secondary valve being indicated in diagram.

Statements of direction refer to FIG. 1, to which reference should first be made.

The housing 5 is connected to the brake pipe by a flange 6, and venting flow from the brake pipe and charging flows occur through the passage 7. Venting flows from the space within the housing 5 (and hence from the brake pipe) occur through the port 8 which leads to atmosphere through the side of an upstanding seat member 9 which carries a rim 11, pressed into place and serving as the main exhaust seat.

The main exhaust valve 12 closes downward against seat 11 and is sealed, when closed, by an annular gasket 13 held by a flanged tubular nut 14 whose upper rim 15 serves as the seat for a smaller vent valve 16, which carries a seat gasket 17 held by a screw, as shown. Both valves are seated by a coil compression spring 18 centered in a guide bushing 19.

Held to the bottom of housing 5 by machine screws (not shown) is the cup-shaped reservoir 21. A gasket 22 seals the joint between the parts 5 and 21, and also between the housing 5 and the open-ended cylinder bushing 23 which has a flange seated in a rabbet, as shown. Pendant from the lower edge of bushing 23 is a yoke 24 which supports a guiding hub 25 through which the piston stem 26 is slidable.

The stem 26 projects downward from a piston 27 which carries a cast iron, expansive piston ring 28 and, at its lower margin, a gasket 29 positioned to seal on an internal rim 31 formed integrally with cylinder bushing 23. Fixed in piston 27 are three upstanding pins 32, each passing through openings formed in wings on valves 12 and 16. The pins 32 are parallel with, and desirably are spaced at uniform angular intervals around the geometrical axis of piston stem 26. Each pin 32 has spaced shoulders whose spacing is such that as piston 27 moves upward from the lowermost position in which gasket 29 seals against rim 31, the shoulders on the pins open first the smaller valve 16 and then the larger valve 12.

In one of the pins 32 is a charging passage 33 which leads to a restricted stabilizing port 34 which opens through the periphery of piston 27 into the interval between piston ring 28 and gasket 29. From this interval a small charging port 35 leads through the cylinder bushing 23.

The details so far described follow the commercial construction long used under the Campbell patent and need no elaboration. Novel features reside in the substitute cap 36 and parts carried thereby, and in connections thereto.

The bushing 19 is carried by cap 36 just as a functionally identical bushing was carried by the original cap. Also carried by cap 36 and coaxial with bushing 19 is a smaller guide bushing 37, open at its upper end, and having near its lower end an internal stop shoulder formed by a pressed-in sleeve 38. A push-rod 39 is reciprocable in bushing 37. This rod has a reduced lower end 41 which projects through sleeve 38 far enough to be forced up positively by valve 16 as the latter opens.

Two O-rings 42 and 43 are confined in grooves encircling push-rod 39 and seal that rod in bushing 37. One such seal is below and the other above a groove 44. The upper wall of groove 44 coacts with latch nose 45 so that the latter functions as a detent when allowed to move to the right under the urge of spring 46. A single-acting piston 47 which as shown, has no sealing ring, the latch nose or detent 45 and may be forced to the left when air under pressure is admitted through port 48 to act on piston 47. This piston moves in a cylinder formed in cap 36 and vented to atmosphere at its outer or left-hand end.

A "reset pipe", as the term is here used, is a pipe charged with air from the main reservoir by flow through the engineer's brake valve when the latter is in a particular position other than release, running and service positions. In all automatic systems, such flow occurs in emergency position. In some automatic systems it may also occur in other special positions, such as "handle off" position. According to the present invention, charging of the reset pipe conditions the system to terminate charging of the charging accessory pipe. This compels the engineer to take affirmative action after any response of the emergency vent valve, as a condition precedent to regaining complete control of the operating functions that are affected by the charging of the accessory pipe. It is a safety factor in that it requires movement of the brake valve into a position which causes or preserves a full brake application.

An engineer's brake valve, of any automatic type, is indicated at 49 and the related reset pipe at 50. Port 51 in cap 36 is connected to the main reservoir, as is indicated by legend. The poppet valve 52 is biased to close against the upper end of bushing 37 by main reservoir pressure and by spring 53. The port 54 is connected through an accessory pipe to some device such as the motor of a normally closed power cut-off switch (indicated by legend) controlling the main propelling engines so that occurrence of an emergency application serves to shut down the propelling engines. Alternatively or additionally, sanders could be connected to be controlled by the accessory pipe. Indeed, various devices which could function usefully during an emergency application may be similarly connected for control.

*Operation*

When a service reduction of brake pipe pressure occurs, the piston 27 rises until the upper shoulders on pins 32 engage valve 16. Stabilizing port 34 is then effective to reduce pressure below piston 27 fast enough to match any service rate of reduction in the brake pipe. Hence the piston rises no further.

When brake pipe pressure is reduced at an emergency rate, the small valve 16 is lifted. The resulting reduction of pressure in housing 5 reduces the closing bias on large valve 12 so that valve 12 is immediately opened by the lower shoulders on the pins 32. The venting area through port 8 is equal to the area of the bore of the brake pipe. Consequently an emergency reduction starting at any vent valve in a train will be propagated at high speed throughout the length of the brake pipe.

Each valve 16, as it opens, strikes the related stem 41 and positively lifts its push-rod 39, so that detent 45 engages in groove 44 and thereafter holds push-rod 39 in position to maintain valve 52 unseated. This admits main reservoir air through the accessory connection 54 to the motor of the power cut-out switch (or other accessory device).

Even if the engineer's brake valve be in release or running position, the cut-out switch cannot close, or any other accessory device function be restored to normal, until the engineer's brake valve is positioned to charge the reset pipe 50, and cause retraction of detent 45.

As explained, the reset pipe will be recharged through the engineer's brake valve when the latter is in emergency position. This is true in all commercial engineer's brake valves for automatic systems. In particular systems, it is also true in certain special positions such as "Handle-off" position.

What is claimed is:
1. The combination of a brake pipe vent valve shiftable reversely between two positions, namely a running position and a venting position; a secondary valve having a normal position which it can assume only when the vent valve is in running position and an abnormal position to which the vent valve positively displaces it as the latter moves to venting position, said secondary valve controlling accessory motor means; means for establishing a bias effective to move the secondary valve to its normal position; and means operable by an engineer's brake valve to render the last-named means effective.

2. The combination of a brake pipe vent valve shiftable reversely between two positions, namely a running position and a venting position; a piloted secondary valve having a normal position which it can assume only when the vent valve is in running position and an abnormal position to which the vent valve positively displaces it as the latter moves to venting position, said secondary valve in said positions serving to energize and alternatively de-energize an accessory motor; biasing means urging the secondary valve to its normal position; a detent having an engaging bias, said detent serving when engaged to retain the secondary valve in its abnormal position; and a fluid pressure motor serving when energized to disengage said detent.

3. The combination defined in claim 2; an engineer's brake valve having a reset connection; and conduit means interconnecting said fluid pressure motor and said reset connection, said reset connection being selectively vented or pressurized in the release and emergency positions, respectively, of said engineer's brake valve.

References Cited in the file of this patent
UNITED STATES PATENTS

| | | |
|---|---|---|
| 945,654 | Wester | Jan. 4, 1910 |
| 1,797,411 | Farmer | Mar. 24, 1931 |
| 1,938,738 | Campbell | Dec. 12, 1933 |
| 2,113,649 | Donovan | Apr. 12, 1938 |
| 2,676,064 | Gorman et al. | Apr. 20, 1954 |